United States Patent
Gagnon (10) Patent No.: US 10,598,401 B2
(45) Date of Patent: Mar. 24, 2020

(54) CONTROLLER, METHOD AND COMPUTER PROGRAM PRODUCT USING A NEURAL NETWORK FOR ADAPTIVELY CONTROLLING AN ENVIRONMENTAL CONDITION IN A BUILDING

(71) Applicant: Distech Controls Inc., Brossard (CA)

(72) Inventor: Dominic Gagnon, St-Bruno-de-Montarville (CA)

(73) Assignee: DISTECH CONTROLS INC., Brossard (CA)

( * ) Notice: Subject to any disclaimer, the term of this patent is extended or adjusted under 35 U.S.C. 154(b) by 88 days.

(21) Appl. No.: 15/927,342

(22) Filed: Mar. 21, 2018

(65) Prior Publication Data

US 2019/0264943 A1    Aug. 29, 2019

Related U.S. Application Data (63) Continuation-in-part of application No. 15/906,709, filed on Feb. 27, 2018.

(51) Int. Cl.
*F24F 11/63* (2018.01)
*G05D 23/19* (2006.01)
(Continued)

(52) U.S. Cl.
CPC .............. *F24F 11/63* (2018.01); *G05B 13/02* (2013.01); *G05B 13/027* (2013.01);
(Continued)

(58) Field of Classification Search
CPC ....... F24F 11/63; G05B 13/027; G05B 13/048
See application file for complete search history.

(56) References Cited

U.S. PATENT DOCUMENTS

| 5,905,659 A | 5/1999 | Rose | |
|---|---|---|---|
| 6,264,111 B1 * | 7/2001 | Nicolson | G05B 11/42 236/51 |

(Continued)

OTHER PUBLICATIONS

Non Final Office Action for U.S. Appl. No. 15/906,709, dated Jul. 25, 2019, 11 pages.

(Continued)

*Primary Examiner* — Vincent H Tran
(74) *Attorney, Agent, or Firm* — RatnerPrestia

(57) ABSTRACT

Environmental condition controller and method for controlling an environmental condition in an area of a building. The controller stores a predictive model generated by a neural network training engine, and a previously calculated environmental condition adjustment value $(y_{n-1})$. The controller receives an environmental condition target value $(x_{ref})$, and an environmental condition measured value $(x)$. The controller recursively calculates an environmental condition adjustment value $(y_n)$ by executing a neural network inference engine using the predictive model for inferring the environmental condition adjustment value $(y_n)$ based on the previously calculated environmental condition adjustment value $(y_{n-1})$, the environmental condition target value $(x_{ref})$, the environmental condition measured value $(x)$, and an adaptive proportionality value $(k)$. The controller also generates and transmits a command based on the environmental condition adjustment value $(y_n)$. The controller further stores the calculated environmental condition adjustment value $(y_n)$ as the previously calculated environmental condition adjustment value $(y_{n-1})$.

20 Claims, 9 Drawing Sheets

(51) Int. Cl.
G05B 13/02 (2006.01)
G05B 13/04 (2006.01)
G06N 5/04 (2006.01)
G06N 3/02 (2006.01)
F24F 110/40 (2018.01)
G05B 17/02 (2006.01)
F24F 110/10 (2018.01)
F24F 110/20 (2018.01)
F24F 130/30 (2018.01)

(52) U.S. Cl.
CPC ........... *G05B 13/048* (2013.01); *G05D 23/19* (2013.01); *G05D 23/1917* (2013.01); *G06N 3/02* (2013.01); *G06N 5/04* (2013.01); *F24F 2110/10* (2018.01); *F24F 2110/20* (2018.01); *F24F 2110/40* (2018.01); *F24F 2130/30* (2018.01); *G05B 17/02* (2013.01); *G05B 2219/2614* (2013.01)

(56) References Cited

U.S. PATENT DOCUMENTS

| | | | |
|---|---|---|---|
| 2004/0181300 A1* | 9/2004 | Clark, Jr. | G05B 13/048 700/73 |
| 2010/0042726 A1 | 2/2010 | Luzon et al. | |
| 2011/0022193 A1 | 1/2011 | Panaitescu | |
| 2011/0106516 A1 | 5/2011 | Friedlander et al. | |
| 2013/0151013 A1 | 6/2013 | Nikovski et al. | |
| 2013/0184887 A1 | 7/2013 | Ainsley et al. | |
| 2014/0027103 A1* | 1/2014 | Strelec | G05D 23/1951 165/239 |
| 2017/0051933 A1* | 2/2017 | Verhoeven | G05B 15/02 |
| 2017/0290095 A1 | 10/2017 | Pereira et al. | |
| 2017/0338802 A1 | 11/2017 | Zhao et al. | |
| 2018/0087790 A1* | 3/2018 | Perez | F24F 11/56 |
| 2018/0267515 A1* | 9/2018 | House | G05B 19/4188 |
| 2019/0212712 A1* | 7/2019 | Wenzel | G05B 17/02 |

OTHER PUBLICATIONS

Entire patent prosecution history of U.S. Appl. No. 15/906,709, filed Feb. 27, 2018, entitled "Controller, Method and Computer Program Product for Controlling an Environmental Condition in a Building."
Final Office Action for U.S. Appl. No. 15/906,709, notification date Nov. 21, 2019 (27 pages).
Costa, L.M. and Kariniotakis, G., Jul. 2007, "A Stochastic Dynamic Programming Model for Optimal Use of Local Energy Resources in a Market Environment," In 2007 IEEE Lausanne Power Tech (pp. 449-454), IEEE (Year: 2007).

* cited by examiner

CONTROLLER, METHOD AND COMPUTER PROGRAM PRODUCT USING A NEURAL NETWORK FOR ADAPTIVELY CONTROLLING AN ENVIRONMENTAL CONDITION IN A BUILDING

TECHNICAL FIELD

The present disclosure relates to the field of building automation, and more precisely environmental condition controlling in an area of a building. More specifically, the present disclosure presents a controller, a method and a computer program product using a neural network for adaptively controlling an environmental condition in an area of a building.

BACKGROUND

Building automation systems are centralized, interlinked, networks of hardware and software, which monitor and control the environmental conditions in an area of a building or a whole building such as commercial, industrial, institutional facilities, etc. For example, a Heating, Ventilation and Air Conditioning (HVAC) control system is used for regulating environmental condition of a building such as temperature. Generally, an environmental condition, for example a temperature, is sought to be obtained. For that purpose, a control system may implement a Proportional-Integral-Derivative (PID) algorithm for further drawing a conclusion on an action to be taken, such as heating, cooling, ventilating etc. Such a control system is referred to as a PID controller.

Although efficient, the PID controller often requires a rather complex calibration to obtain the proper degree of efficiency. Furthermore, a poorly or inappropriately calibrated PID controller provides an average control and efficiency. Also, the derivative of the error amplifies higher frequency measurements, which sometimes distort an output of the control system, resulting in a poor environmental condition control. Moreover, the PID controller usually has a linear output, which is highly inappropriate for non-linear systems such as HVAC control systems.

One way to improve the control provided by the PID controller of an environmental condition in an area of a building is to use an adaptive control based on recursive calculations to control the environmental condition. For doing so, an environmental conditional adjustment value ($y_n$) is recursively calculated, as will be detailed later in the description. The recursive calculation of the conditional adjustment value ($y_n$) is based on several parameters, and different recursive functions may be used for implementing the recursive calculation. However, a given PID controller may implement only one of the recursive functions, while the current environment condition would be better addressed with another one of the recursive functions. Alternatively, a given PID controller implements several of the recursive function; but is not always capable of selecting which one among the implemented recursive functions will provide the best control for a given environmental condition.

Current advances in artificial intelligence, and more specifically in neural networks, can be taken advantage of to replace all the recursive functions. More specifically, a model taking into consideration the parameters of the recursive functions to determine the conditional adjustment value ($y_n$) can be generated and used by a neural network.

Therefore, there is a need for a controller comprising an adaptive control based on a neural network, and for a method and computer program product, for controlling an environmental condition in an area of a building using the neural network based adaptive control.

SUMMARY

According to a first aspect, the present disclosure provides an environmental condition controller. The environmental condition controller uses a neural network for adaptively controlling an environmental condition of an area of a building. The environmental condition controller comprises memory, a communication interface, and a processing unit. The memory stores a predictive model generated by a neural network training engine, and a previously calculated environmental condition adjustment value ($y_{n-1}$). The communication interface receives an environmental condition target value ($x_{ref}$), and an environmental condition measured value (x) for the area of the building. The processing unit recursively calculates an environmental condition adjustment value ($y_n$) by executing a neural network inference engine using the predictive model for inferring the environmental condition adjustment value ($y_n$). The inference is based on the previously calculated environmental condition adjustment value ($y_{n-1}$), the environmental condition target value ($x_{ref}$), the environmental condition measured value (x), and an adaptive proportionality value (k). The processing unit also generates and transmits a command based on the calculated environmental condition adjustment value ($y_n$). The processing unit further stores the calculated environmental condition adjustment value ($y_n$) in the memory as the previously calculated environmental condition adjustment ($y_{n-1}$).

According to a second aspect, the present disclosure provides a method using a neural network for adaptatively controlling at least one environmental condition in an area of a building. The method comprises storing in a memory of an environmental condition controller a predictive model generated by a neural network training engine, and a previously calculated environmental condition adjustment value ($y_{n-1}$). The method comprises receiving an environmental condition target value ($x_{ref}$) for the environmental condition via a communication interface of an environmental condition controller. The method further comprises receiving an environmental condition measured value (x) for the area of the building via the communication interface. The method pursues with calculating by a processing unit of the environmental condition controller an environmental condition adjustment value ($y_n$) by executing a neural network inference engine using the predictive model for inferring the environmental condition adjustment value ($y_n$). The inference is based on the previously calculated environmental condition adjustment value ($y_{n-1}$), the environmental condition target value ($x_{ref}$), the environmental condition measured value (x), and an adaptive proportionality value (k). The method pursues with generating and transmitting by the processing unit a command based on the environmental condition adjustment value ($y_n$). The method further comprises storing in the memory the calculated environmental condition adjustment value ($y_n$) as the previously calculated environmental condition adjustment value ($y_{n-1}$).

In a particular aspect, the following steps are executed recursively: receiving the environmental condition measured value (x) for the area of the building via the communication interface, calculating by the processing unit the environmental condition adjustment value ($y_n$) by executing the neural network inference engine, generating and transmitting by the processing unit the command based on the environmental condition adjustment value ($y_n$), and storing in the memory the calculated environmental condition adjustment value ($y_n$) as the previously calculated environmental condition adjustment value ($y_{n-1}$).

According to a third aspect, a non-transitory computer program product comprises instructions deliverable via an electronically-readable media, such as storage media and communication links. The instructions when executed by a processing unit of an environmental condition controller provide for adaptively controlling an environmental condition in an area of a building by implementing the aforementioned method.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

The following terminology is used throughout the present specification:

Environmental condition: State or influence in an area. The environmental condition comprises any of the following: temperature, pressure, humidity, lighting, CO2, flow, radiation, level, speed, sound; a variation of at least one of the following, temperature, pressure, humidity and lighting, CO2 levels, flows, radiations, water levels, speed, sound levels, etc., and/or a combination thereof.

Area of a building: The expression 'area of a building' is used throughout the present specification to refer to the interior of a whole building or a portion of the interior of the building such as, without limitation: a zone, a floor, a room, an aisle, etc.

Various aspects of the present disclosure generally address one or more of the problems related to environment control systems for buildings, and more particularly to environmental condition control in an area of a building.

Adaptive Control

The present disclosure relates to adaptive control. The adaptive control is based on recursive calculations to control an environmental condition in an area of a building, so as to efficiently recursively reach and smoothly maintain an environmental condition target value ($x_{ref}$). For doing so, the present adaptive control recursively calculates an environmental conditional adjustment value ($y_n$) upon receipt of an environmental condition measured value (x). The present adaptive control further iteratively calculates an adaptive proportionality value (k) when certain criteria are met. Recursively calculating the environmental conditional adjustment value ($y_n$) and iteratively re-calculating the adaptive proportionality value (k) flattens sudden fluctuations of the environmental condition, thereby ensuring a smoother control of the environmental condition in the area of the building; and further reducing strain on the equipment (also called herein controlled equipment). As the environmental conditional adjustment value ($y_n$) is recursively calculated, the following nomenclature will be used throughout the present specification: ($y_n$) refers to a current calculation of the environmental conditional adjustment, ($y_{n-1}$) refers to a previously calculated environmental conditional adjustment value, and so on.

The environmental condition adjustment value ($y_n$) is calculated by a recursive function using one of the following equations:

$$y_n = k(n) + x - A \cdot x_{ref} \quad \text{(Equation 1)}$$

$$y_n = k(y_{n-1} + x - B \cdot x_{ref}) \quad \text{(Equation 2)}$$

$$y_n = y_{n-1} + k(y_{n-1} + x - 2x_{ref}) \quad \text{(Equation 3)}$$

wherein:
f(n) is a function comprising a previously calculated environmental condition adjustment value (e.g. $y_{n-1}$, $y_{n-2}$, $y_{n-3}$, etc.);
A is a real constant; and
B is a real constant.

The adaptive proportionality value (k) is re-calculated when at least one of the following conditions is met:
the environmental condition adjustment value ($y_n$) exceeds the environmental condition measured value (x); or
when a difference between the environmental condition measured value (x) and the environmental condition adjustment ($y_n$) is greater than a predefined tolerated variance.

The adaptive proportionality value (k) is re-calculated using the following equation:

$$k = e^{C \Delta t_c} - 1 \quad \text{(Equation 4)}$$

where:
C is calculated using the equation $C = S/(y_{max} - y_{n-1})$;
S is the slope between two previous environmental condition adjustment values over time, and is calculated using the equation $S = dy/dt$;
$y_{max}$ is the environmental condition maximum output; and
$\Delta t_c$ is a time interval between each recursive calculation of equations (1), (2) and (3).

When the adaptive proportionality value (k) is calculated as previously described, the iterative re-calculation of its value is performed considerably less often than the rate of receipt of the environmental condition measured value (x). Additional condition(s) may be set on the calculation of the adaptive proportionality value (k) to take into consideration specific particularities of the controlled equipment being controlled, such as for example additional compensations at different phases of operation, such as for example doubling the calculated value of the adaptive proportionality value (k) when the controlled equipment is as start-up, tripling the value of the calculated adaptive proportionality value (k) at run-time (but not exceeding 1.5× its preceding value), etc.

Adaptive Control Using a Neural Network

The recursive function based on equations (1) (2) or (3) is replaced by a neural network. The output of the neural network is the environmental condition adjustment value ($y_n$) calculated by the recursive function. The inputs of the neural network are the parameters of the recursive function. More specifically, the inputs of the neural network include the environmental condition target value ($x_{ref}$), the environmental condition measured value (x), the previously calculated environmental condition adjustment value ($y_{n-1}$) and the adaptive proportionality value (k).

In the case of equation (1), the recursive function may take into consideration additional previously calculated environmental condition adjustment values ($y_{n-2}$), ($y_{n-3}$), etc. via the function f(n). Therefore, the inputs of the neural networks may also include the additional previously calculated environmental condition adjustment values ($y_{n-2}$), ($y_{n-3}$), etc.

During a training phase, a neural network training engine is used for generating a predictive model. As is well known in the art of neural network, during the training phase, the neural network implemented by the neural network training engine adjusts its weights. Furthermore, during the training phase, the number of layers of the neural network and the number of nodes per layer can be adjusted to improve the accuracy of the model. At the end of the training phase, the predictive model generated by the neural network training engine includes the number of layers, the number of nodes per layer, and the weights associated to each node.

The training consists in processing a large number of training inputs and corresponding training outputs, so that the neural network training engine adapts its predictive model (the values of the weights) for being capable of inferring a given training output when presented with the corresponding training inputs.

A level of accuracy is generally defined for deciding whether the accuracy of the predictive model is satisfying. For example, the level of accuracy is a percentage, such as 95%. Having a sample of test inputs and corresponding test outputs, at least 95% of the test outputs shall be accurately predicted by the neural network using the predictive model and the corresponding test inputs. Furthermore, a margin of tolerance may be used for evaluating the outputs inferred by the neural network with the predictive model under evaluation. For example, the margin of tolerance is a percentage of error (e.g. 5%) allowed when comparing the output inferred by the neural network and the expected output. Alternatively, the margin of tolerance is an absolute value and the output inferred by the neural network shall be in the range [expected output minus tolerance value, expected output plus tolerance value].

The training inputs and corresponding training outputs used during the training phase can be generated with the recursive function based on equations (1) (2) or (3).

For example, each one of the equations (1), (2) and (3) is better adapted to a given set of environmental conditions. A first subset of the training inputs and corresponding training outputs is generated using equation (1) for the recursive function when a first set of environmental conditions is considered. Similarly, a second subset of the training inputs and corresponding training outputs is generated using equation (2) for the recursive function when a second set of environmental conditions is considered. Finally, a third subset of the training inputs and corresponding training outputs is generated using equation (3) for the recursive function when a third set of environmental conditions is considered. For illustration purposes only, we consider the following use case. The environmental condition is the temperature of an area of a building. It has been experimentally determined that equation (1) is more effective when the difference between the target temperature ($T_{ref}$) and the measured temperature (T) is greater than a threshold (e.g. 5 degrees Celsius). It also has been experimentally determined that equation (2) is more effective when the target temperature ($T_{ref}$) is lower than a given value (e.g. 18 degrees Celsius). It further has been experimentally determined that equation (3) is more effective in all other cases. The three subsets of training inputs and corresponding training outputs are generated by alternatively using equations (1), (2) or (3) based on experimental values of the target temperature ($T_{ref}$) and the measured temperature (T). This use case has been over-simplified for illustration purposes. In general, several criteria should be evaluated in combination (e.g. difference between the target temperature ($T_{ref}$) and the measured temperature (T) AND value of the target temperature ($T_{ref}$)) for determining which one of the equations (1), (2) or (3) is more effective. The combination of criteria makes it difficult for a human being to establish a reliable set of rules for determining which one of the equations (1), (2) or (3) shall be used in which conditions. A human being is only capable on noticing that one equation is more effective in certain conditions, without being able to generalize this observation into an actionable set of rules. By contrast, the neural network training engine is capable of capturing in the predictive model the influence of all the input parameters considered in combination through the training process performed during the training phase.

In another example, having an initial environmental condition measured value ($x_0$) and an environmental condition target value ($x_{ref}$), each one of the equations (1), (2) and (3) is used for converging from the initial environmental condition measured value ($x_0$) towards the environmental condition target value ($x_{ref}$). The convergence is then evaluated based on pre-defined criteria (e.g. speed of the convergence, smoothness of the convergence, etc.). The best equation among (1), (2) and (3) is then selected based on the pre-defined criteria. A subset of the training inputs and corresponding training outputs is determined based on the usage of the selected equation for converging from the initial environmental condition measured value ($x_0$) towards the environmental condition target value ($x_{ref}$). The process is repeated by varying the initial environmental condition measured value ($x_0$) and the environmental condition target value ($x_{ref}$).

In still another example, having an initial environmental condition measured value ($x_0$) and an environmental condition target value ($x_{ref}$), each one of the equations (1), (2) and (3) is evaluated at each step of the convergence from the initial environmental condition measured value ($x_0$) towards the environmental condition target value ($x_{ref}$). Thus, at step N of the convergence, having an environmental condition measured value ($x_N$) and an environmental condition target value ($x_{ref}$), each one of the equations (1), (2) and (3) is evaluated based on pre-defined criteria (e.g. smoothness of the convergence, etc.). The best equation among (1), (2) and (3) is then selected based on the pre-defined criteria for step N. A subset of the training inputs and corresponding training outputs consists of the inputs and calculated output of the selected equation. The process is repeated for each step N of the convergence, and further by varying the initial environmental condition measured value ($x_0$) and the environmental condition target value ($x_{ref}$).

A person skilled in the art would readily understand that equations (1), (2) and (3) are for illustration purposes only. Other equations may be defined for generating the predictive model during the training phase.

A different predictive model is generated for each type of environmental condition (e.g. temperature, pressure, humidity, lighting, etc.). The equations (1), (2) and (3) may be adapted and optimized for generating each predictive model corresponding to a given environmental condition. Alternatively, the same equations (1), (2) and (3) are used for generating several predictive models corresponding to several environmental conditions.

During an operational phase, a neural network inference engine infers an output based on inputs using the predictive model. The output is the environmental condition adjustment value ($y_n$). The inputs are the environmental condition target value ($x_{ref}$), the environmental condition measured value (x), the previously calculated environmental condition adjustment value ($y_{n-1}$) and the adaptive proportionality value (k). As mentioned previously, the inputs may also include additional previously calculated environmental condition adjustment values ($y_{n-2}$), ($y_{n-3}$), etc. The inputs and output used during the operational phase shall be the same as the inputs and output used during the training phase.

Areas of a Building

Figure 1:
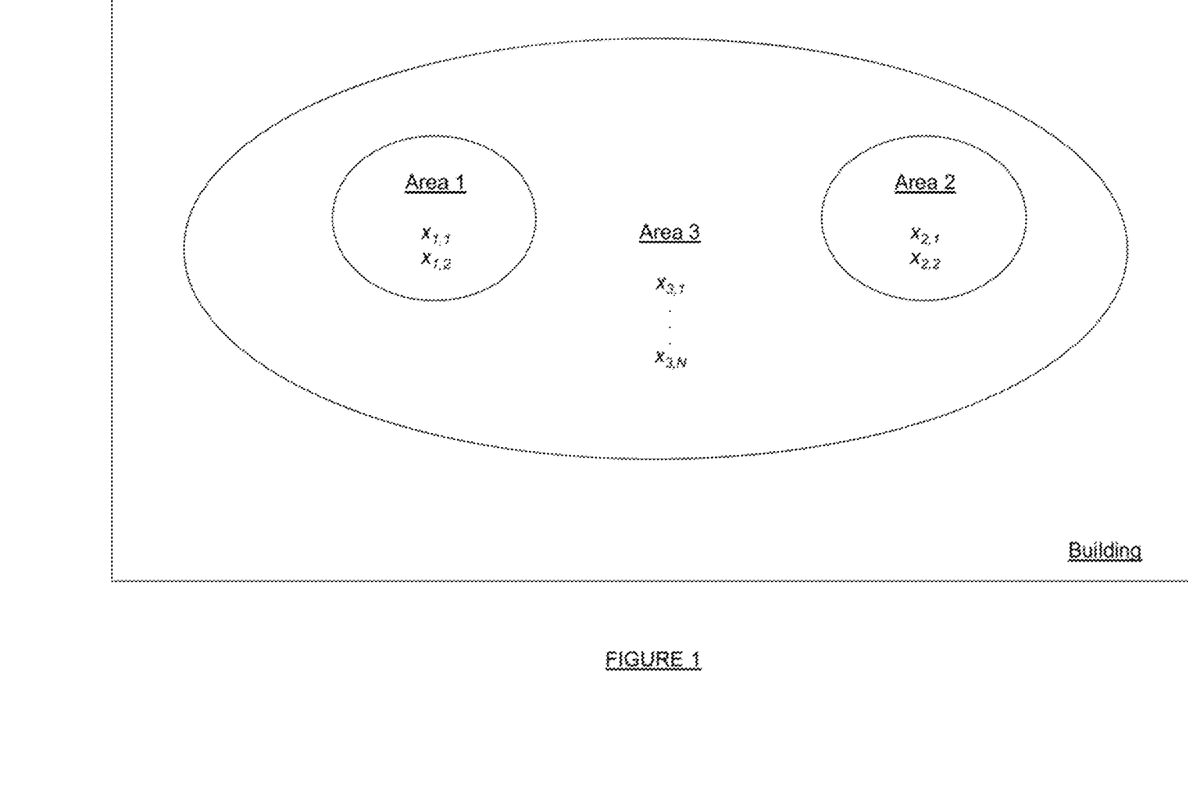
FIG. 1 is a schematic representing several areas of a building with corresponding environmental conditions.

Reference is now made to FIG. 1, which is a schematic representing several areas of a building with corresponding environmental conditions. A building may be divided into many areas, such as for example areas 1, 2 and 3. Each area may be independent of the other, such as shown by areas 1 and 2. Other areas may be related or dependent of other areas, such as area 3, which includes areas 1 and 2. Each area may have one or several environmental conditions, which can be measured and controlled.

Environmental Control System

Figure 2:
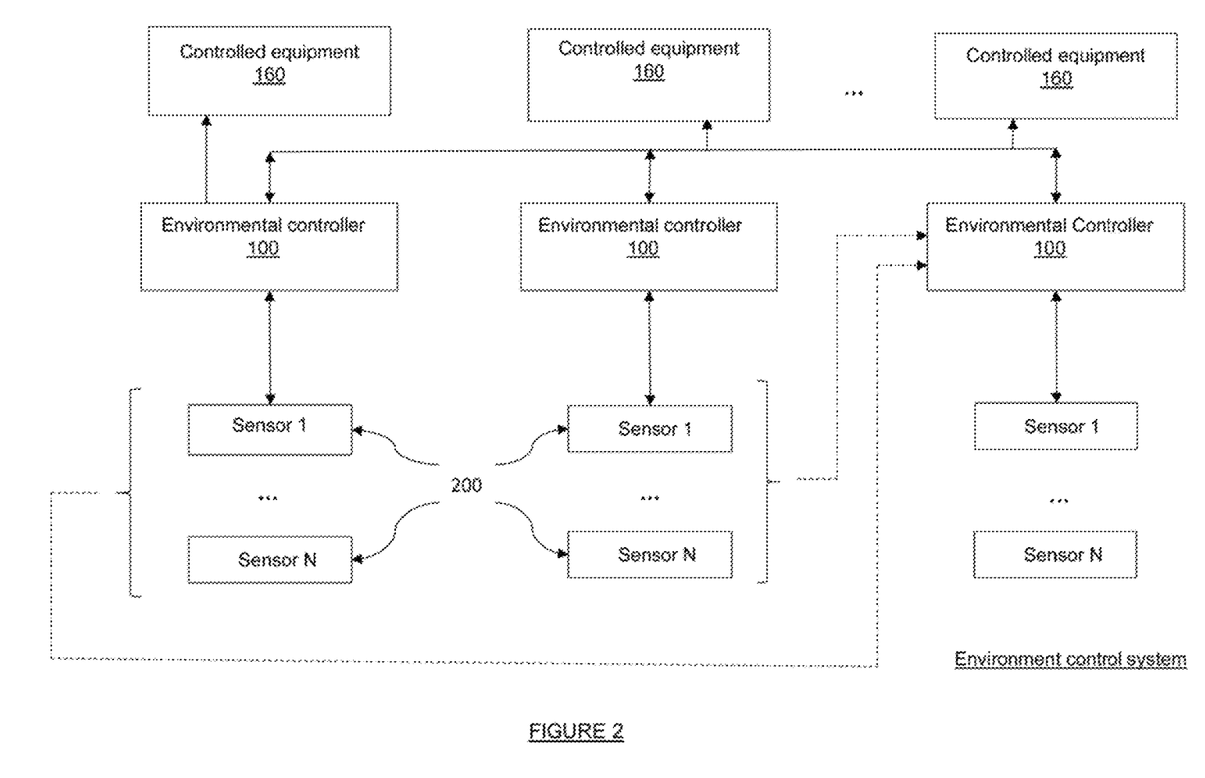
FIG. 2 is an exemplary functional diagram of interactions between components of an environmental control system.

An environment control system for controlling environmental condition of an area of a building is provided. Referring to FIG. 2, the environment control system controls one or several environmental conditions of one or several areas of the building. The environment control system comprises at least one environmental condition controller 100, at least one sensor 200 and at least one controlled equipment 160. Although three environmental condition controllers 100 and three controlled equipment 160 are shown on FIG. 2, the present system is not limited to such a configuration. For example, several controlled equipment 160 may communicate with a single environmental condition controller 100. Furthermore, several controlled equipment 160 may be used to control various environmental conditions in an area of a building, wherein some of the controlled equipment 160 communicate with one environmental condition controller 100 while other controlled equipment 160 communicate with a different environmental condition controller. The controlled equipment 160 is any type of equipment, which impacts at least one of the environmental conditions in at least one area of the building. For example, the controlled equipment 160 may be a heater, a ventilator, a humidifier, a dimmer, etc. The controlled equipment 160 thus performs at least one of the following: heating, cooling, ventilating, humidifying, dehumidifying, changing a lighting (e.g. turning on/off at least one light), opening or closing curtains, or a combination thereof.

When more than one sensor is used, the plurality of sensors 200 may be disposed in parallel, in series, or in a combination of parallel and serial configurations. For example, on FIG. 2, a plurality of sensors 202 are disposed in such a way that some sensors communicate only with a specific environmental condition controller 100, while other sensors may communicate with more than one environmental condition controllers 100. The disposition of the sensors 200 presented in FIG. 2 is for exemplary purposes only and are not intended to limit the scope of the present disclosure, as the number of sensors 200 and their disposition may vary and/or be different. Examples of sensors include, without limitations, a thermal sensor (such as a thermometer), a pressure sensor (such as a barometer), a hygrometer, a light sensor (such as a photo-sensor), or combination thereof etc. Those skilled in the art will understand that the functional diagram provided on FIG. 2 has been simplified for clarification purposes, and that many variants in the number and exchanges between the environmental condition controllers 100, the controlled equipment 160 and the sensors 200 may be performed.

Environmental Condition Controller

Figure 3A:
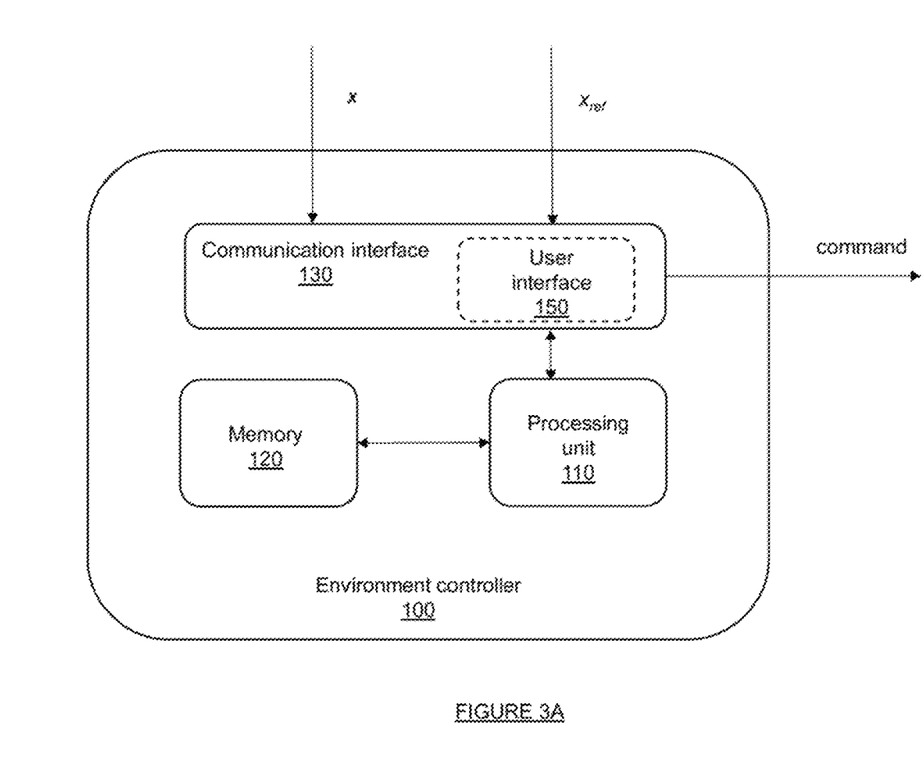
FIG. 3A is a functional diagram of an environmental condition controller.

Referring now concurrently to FIGS. 2 and 3A, the environmental condition controller 100 comprises a processing unit 110, a memory 120, a communication interface 130 and a user interface 150. For clarity purposes, the following description describes the environmental condition controller 100 as receiving data, collecting data, performing calculations and sending instructions for one area of the building. However, those skilled in the art will understand that the environmental condition controller 100 may receive environmental conditions measured values, collect data, perform calculation generate and transmit commands for several areas of the building concurrently.

The processing unit 110 comprises one or more processors (not represented in FIG. 3A) capable of executing instructions of a computer program. Each processor has one or several cores.

The memory 120 may comprise several memories, and use different types of memories, including volatile memory (such as a volatile Random-Access Memory (RAM)) and non-volatile memory (such as a hard drive or a flash memory).

The memory 120 stores instructions of computer program(s) executed by the processing unit 110, received environmental conditions, target values, and calculated values generated by the execution of the computer program(s).

The communication interface 130 supports any communication technology known in the art, such as for example: Wi-Fi, Wi-Fi mesh, Local Area Network (LAN), Universal Serial Bus (USB), taken solely or in combination. The communication interface 130 communicates, i.e. exchanges data, with the sensor 200 via wires and/or wirelessly. The communication interface 130 communicates with the sensor 200 using any known standard and communication protocol. Alternately, the communication interface 130 may only receive environmental condition measured values (x) at predetermined intervals from the sensors 200.

The communication interface 130 also exchanges data with one or several controlled equipment 160. The communication interface 130 communicates with the controlled equipment 160 in one direction or bi-directionally, directly or through a bus as shown on FIG. 3A. The processing unit 110 sends commands through the communication interface 130 to the controlled equipment 160 and receives through the communication interface 130 confirmation and measurements performed by the controlled equipment 160.

The communication interface 130 also receives for each area of the building an environmental condition target value ($x_{ref}$). The environmental condition target value ($x_{ref}$) is received from any of the following: another environmental condition controller 100, a master building controller (not shown), or inputted by a technician configuring or performing maintenance, either locally or remotely. Furthermore, the communication interface 130 receives periodically the environmental condition measured value (x) for the area of the building from one or several sensors 200.

Alternatively, instead of receiving the environmental condition target value ($x_{ref}$) for each area of the building, the environmental condition target value ($x_{ref}$) may be locally or remotely calculated, based on a subset of known values comprising for example comfort levels, time of day, number of occupant in the area of the building, vocation of the area of the building, etc.

The communication interface 130 may further comprise a user interface 150 (e.g. a keyboard, a mouse, a touchscreen, etc.) for allowing a technician to locally input or adjust the environmental condition target value ($x_{ref}$) for the area of the building.

Figure 3B:
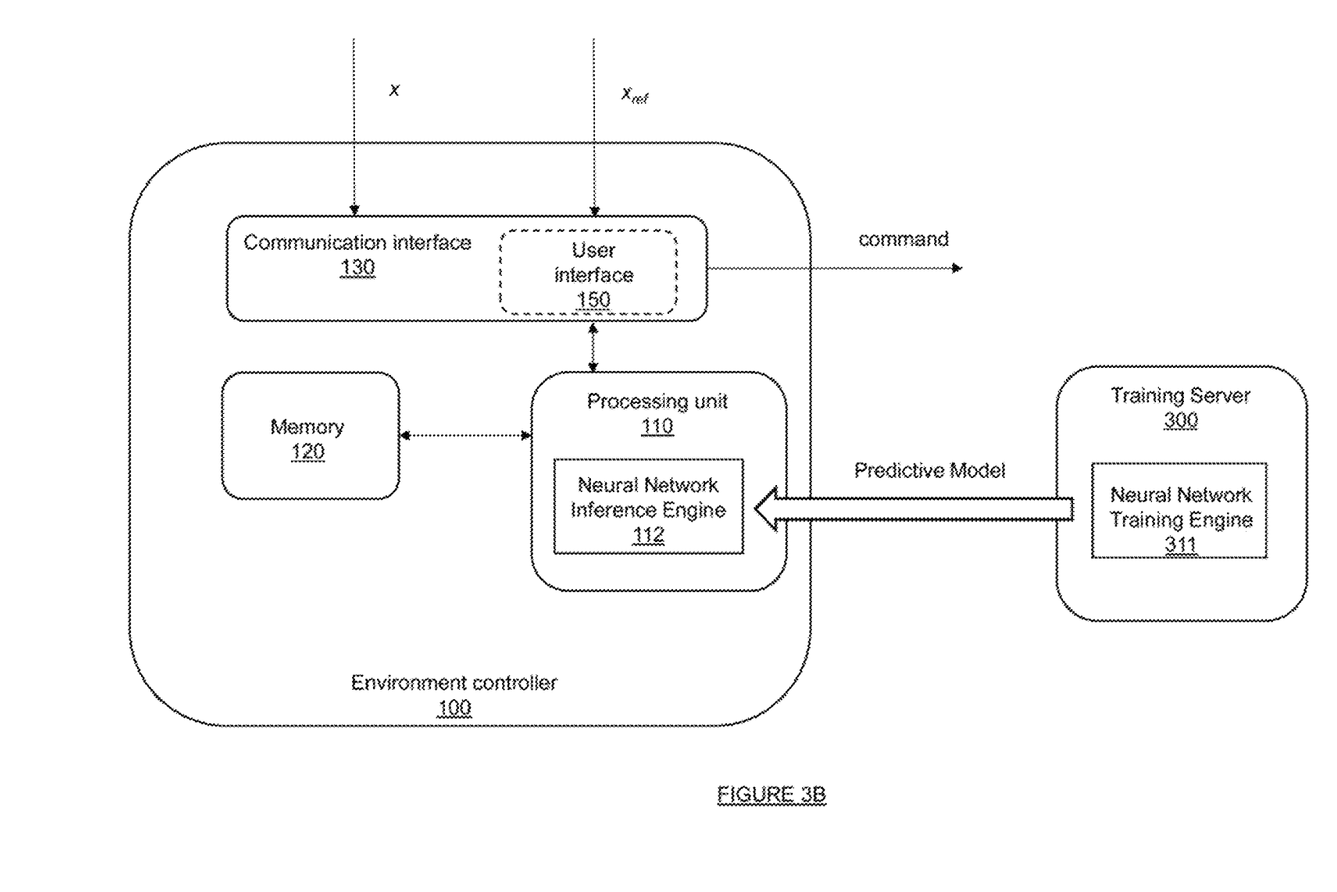
FIG. 3B is a functional diagram of the environmental condition controller of FIG. 3A further including a neural network inference engine.

Reference is now made concurrently to FIGS. 3A and 3B, where FIG. 3B depicts the environment controller 100 of FIG. 3A further executing a neural network inference engine 112. The neural network inference engine 112 is executed by the processing unit 110 of the environment controller 100.

Also represented in FIG. 3B is a training server 300. Although not represented in FIG. 3B for simplification purposes, the training server 300 comprises a processing unit, memory and a communication interface. The processing unit of the training server 300 executes a neural network training engine 311.

The execution of the neural network training engine 311 generates a predictive model, which is transmitted to the environment controller 100 via the communication interface of the training server 300. For example, the predictive model is transmitted over a communication network and received via the communication interface 130 of the environment controller 100.

Figure 4:
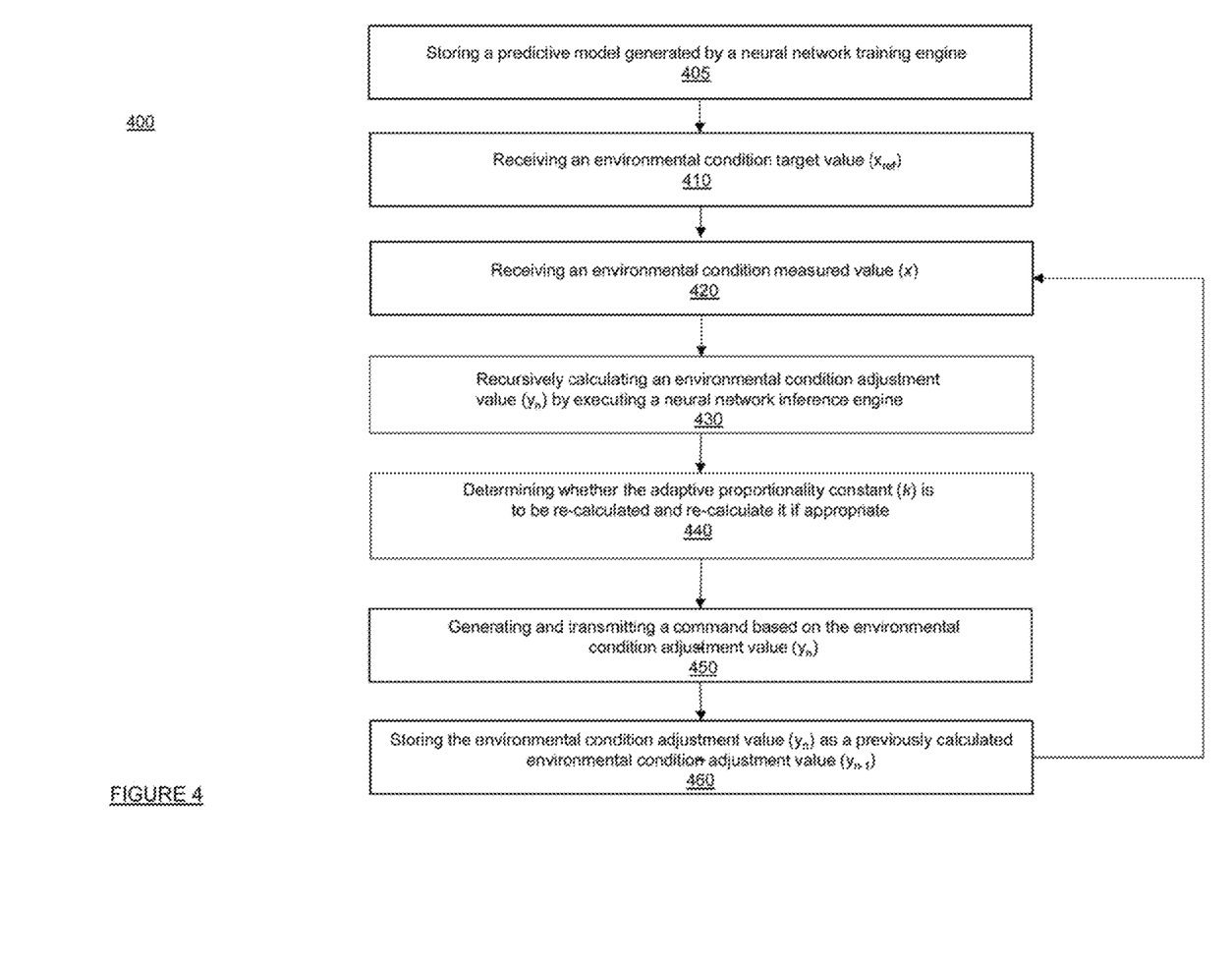
FIG. 4 represents a method for adaptively controlling an environmental condition in an area of a building via a neural network.

Reference is now made concurrently to FIGS. 2, 3B and 4, where FIG. 4 depicts an exemplary flowchart of a method of operation of the present environment controller 100.

At the beginning of the operational phase, the environment controller 100 receives the predictive model generated by the neural network training engine 311 of the training server 300. The processing unit 110 stores the predictive model (received via the communication interface 130) in memory 120 at step 405.

The processing unit 110 receives from the communication interface 130 the environmental condition target value ($x_{ref}$) in step 410. The processing unit 110 also periodically or intermittently receives (from a sensor 200) through the communication interface 130 the environmental condition measured value (x) in step 420. As the environment controller 100 typically controls simultaneously several environmental conditions for several areas of the building, the processing unit typically receives through the communication interface 130 the environmental condition target values ($x_{ref}$) and the environmental condition measured values (x) for several environmental conditions in several areas of the building. The present description will be limited to one environmental condition in one area of the building for concision purposes only.

Upon receipt of the environmental condition measured value (x), the processing unit 110 calculates the environmental condition adjustment ($y_n$) in step 430. The calculation is performed by executing the neural network inference engine 112, which uses the predictive model (stored at step 405) for inferring the environmental condition adjustment value ($y_n$). The inference is based on the following inputs of neural network inference engine 112: a previously calculated environmental condition adjustment value ($y_{n-1}$), the environmental condition target value ($x_{ref}$), the environmental condition measured value (x), and an adaptive proportionality value (k). The calculation is recursive since the neural network inference engine 112 uses the environmental condition adjustment value ($y_{n-1}$) calculated at iteration n−1 to infer the environmental condition adjustment value ($y_n$) for itineration n.

As mentioned previously, the recursive calculation (at step 430) of the environmental condition adjustment value ($y_n$) may be based on more than one previously calculated environmental condition adjustment value (stored in the memory 120) used as inputs of the neural network inference engine 112. For example, the inputs of the neural network inference engine 112 include the last two previously calculated environmental condition adjustment value ($y_{n-1}$) and ($y_{n-2}$). In another example, the inputs of the neural network inference engine 112 include the last three previously calculated environmental condition adjustment value ($y_{n-1}$), ($y_{n-2}$) and ($y_{n-3}$). During the training phase, the neural network training engine 111 has used as inputs the same set of previously calculated environmental condition adjustment value(s) for generating the predictive model, as the one used as inputs by the neural network inference engine 112 at step 430.

When the environmental condition controller 100 is initiated, or when the controlled equipment 160 is newly installed or re-initiated, the processing unit 110 uses predetermined initial values for the adaptive proportionality value (k) and for the previously calculated environmental condition adjustment value ($y_{n-1}$). For example, the processing unit 110 may use predetermined initial values between 0 and 1, or randomly selected values between 0 and 1.

After having calculated the environmental condition adjustment ($y_n$), the processing unit 110 determines whether the adaptive proportionality value (k) has to be re-calculated in step 440. The adaptive proportionality value (k) is re-calculated by the processing unit 110 when at least one of the following conditions is met:
 the environmental condition adjustment ($y_n$) exceeds the environmental condition value (x); or
 when a difference between the environmental condition measured value (x) and the environmental condition adjustment ($y_n$) is greater than a predefined tolerated variance.

In step 440, the processing unit 110 further re-calculates the adaptive proportionality value (k) using equation (4) previously presented.

The processing unit 110 generates and transmits a command to the controlled equipment 160 via the communication interface 130, in step 450. The command includes instructions and the environmental condition adjustment value ($y_n$). Examples of commands include: heating, ventilating, cooling, humidifying, dehumidifying, changing lighting, adjusting sound, adjusting liquid level, reducing $CO_2$ level, etc.

The processing unit 110 then stores in memory 120 the calculated environmental condition adjustment value ($y_n$) as a previously calculated environmental condition adjustment value ($y_{n-1}$) in step 460. The environmental condition target value ($x_{ref}$) is also stored in memory 120 by the processing unit 110 in step 410 or 460. Furthermore, the processing unit 110 may periodically store the environmental condition measured value (x). The processing unit 110 may also store in memory 120 the re-calculated adaptive proportionality value (k).

As illustrated in FIG. 4, after performing step 460, the method 400 starts the next iteration at step 420 upon reception of a new value of the environmental condition measured value (x).

Furthermore, a specific computer program has instructions for implementing steps of the method 400. The instructions are comprised in a non-transitory computer program product (e.g. the memory 120). The instructions provide for adaptively controlling an environmental condition in an area of a building, when executed by the processing unit 110 of the environmental condition controller 100. The instructions are deliverable via an electronically-readable media, such as a storage media (e.g. USB key) or via communication links (e.g. Wi-Fi network or a Local Area network) through the communication interface 130 of the environmental condition controller 100.

Figure 5:
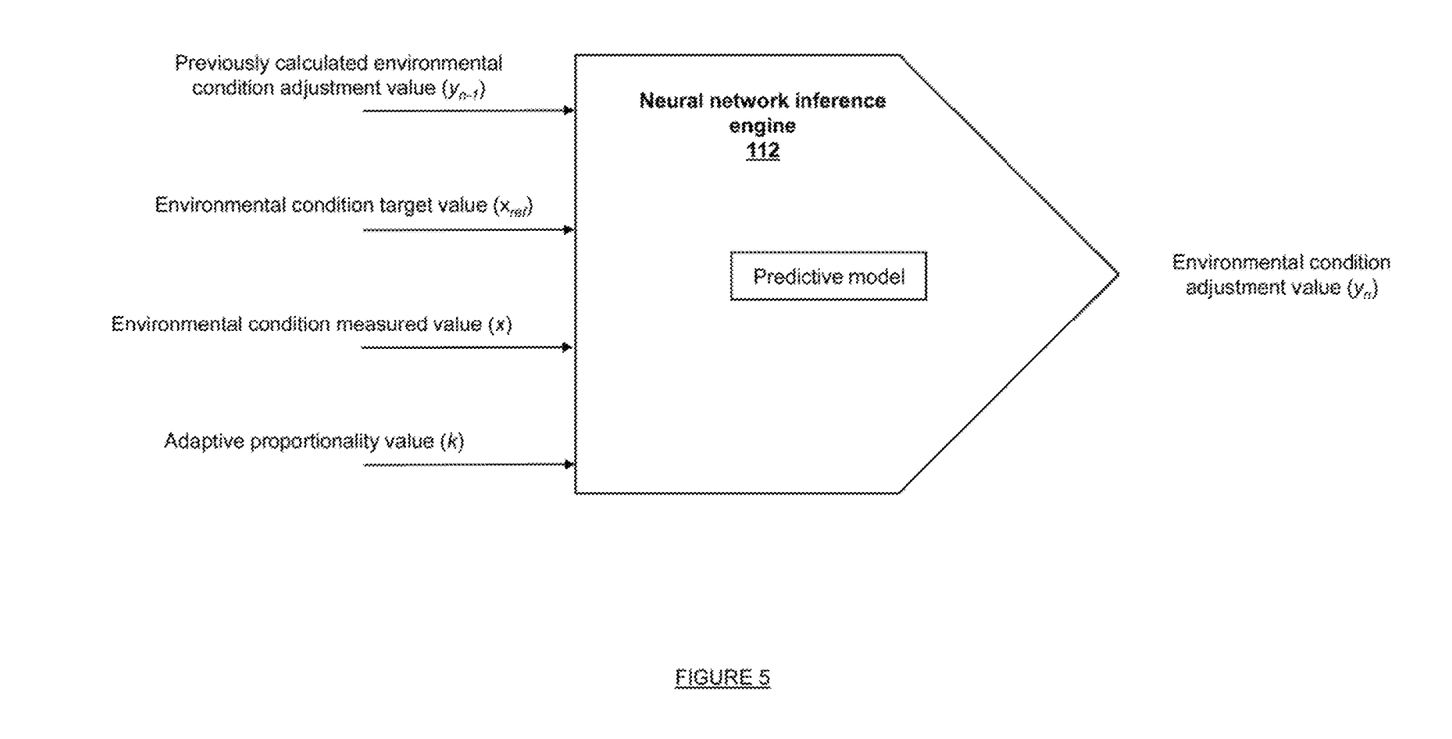
FIG. 5 is a schematic representation of a neural network inference engine executed by the environment controller of FIG. 3B.

Reference is now made to FIG. 5, which illustrates the aforementioned neural network inference engine with its inputs and its output. FIG. 5 corresponds to the neural network inference engine 112 executed at step 430 of the method 400, as illustrated in FIGS. 3B and 4.

Figure 6:
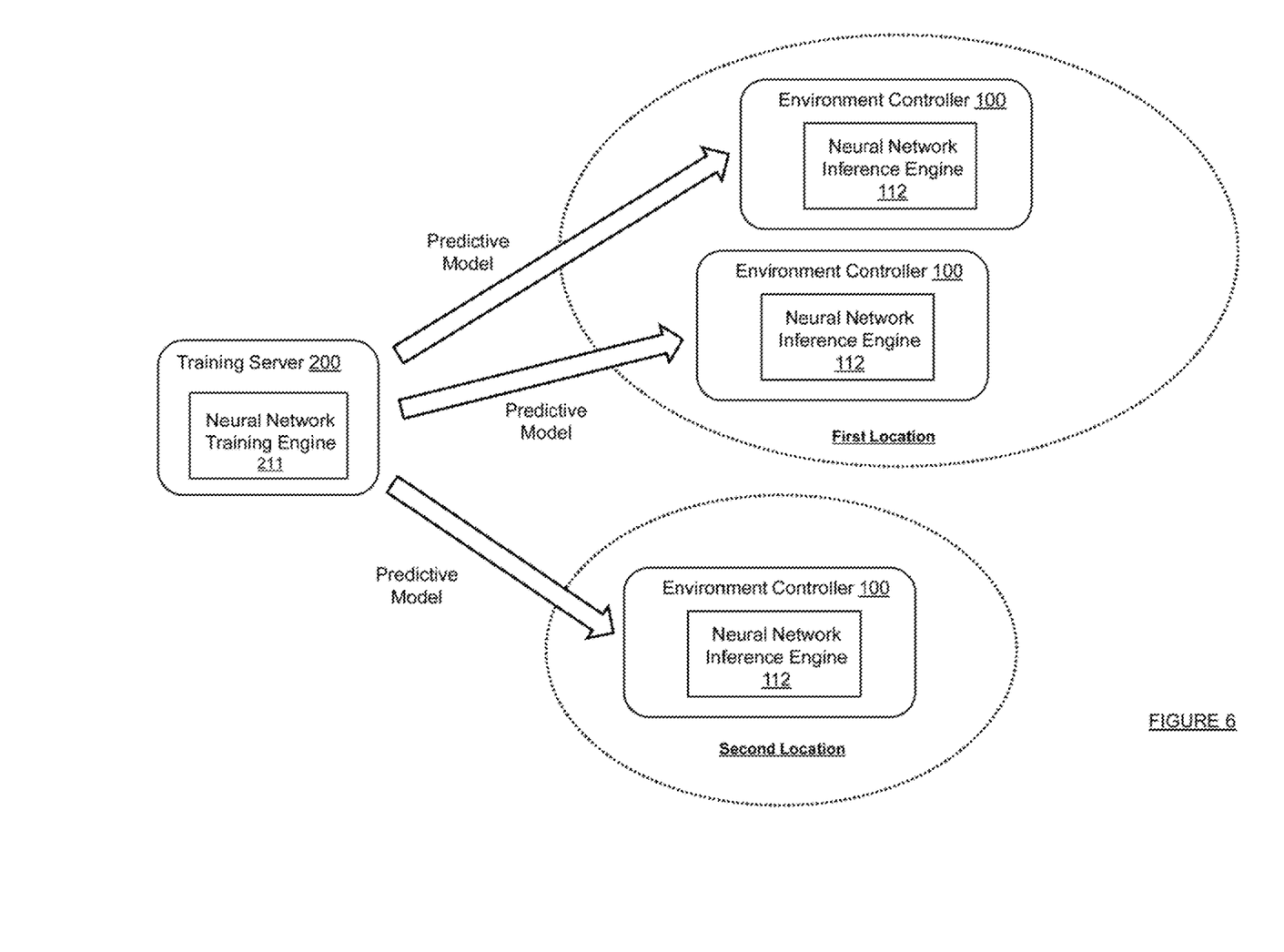
FIG. 6 represents an environment control system where environment controllers implementing the method illustrated in FIG. 4 are deployed.

Reference is now made concurrently to FIGS. 2, 3B, 4 and 6, where FIG. 6 illustrates the usage of the method 400 in a large environment control system.

A first plurality of environment controllers 100 implementing the method 400 are deployed at a first location. Only two environment controllers 100 are represented for illustration purposes, but any number of environment controllers 100 may be deployed.

A second plurality of environment controllers 100 implementing the method 400 are deployed at a second location. Only one environment controller 100 is represented for illustration purposes, but any number of environment controllers 100 may be deployed.

The first and second locations may consist of different buildings, different floors of the same building, etc. Only two locations are represented for illustration purposes, but any number of locations may be considered.

Each environment controller 100 represented in FIG. 6 interacts with at least one sensor 200 and at least one controlled equipment 160, as illustrated in FIG. 2.

The environment controllers 100 correspond to the environment controllers represented in FIG. 3B and execute the neural network inference engine 112. Each environment controller 100 receives a predictive model from the centralized training server 200 (e.g. a cloud-based training server 200 in communication with the environment controllers 100 via a networking infrastructure, as is well known in the art). The same predictive model is used for all the environment controllers. Alternatively, a plurality of predictive models is generated, and takes into account specific operating conditions of the environment controllers 100. For example, a first predictive model is generated for environment controllers 100 controlling a first type of controlled equipment 160, and a second predictive model is generated for other environment controllers 100 controlling a second type of controlled equipment 160. Additionally, a given environment controller 100 may receive several predictive models for controlling different types of environmental conditions (e.g. a first predictive model is used for controlling the temperature via a controlled equipment 160 such as a Variable Air Volume (VAV) appliance, and a second predictive model is used for controlling the humidity level via the same or another controlled equipment 160).

FIG. 6 illustrates a decentralized architecture, where the environment controllers 100 take autonomous decisions for controlling the controlled equipment 160, using the predictive model as illustrated in the method 400.

In an alternative centralized architecture not represented in the Figures, the neural network inference engine 112 may be executed by a processing unit of a dedicated inference server serving a plurality of environment controllers 100. The steps of the method 400 are performed by the inference server. Each environment controller 100 transmits the environmental condition target value ($x_{ref}$) and the environmental condition measured values (x) to the inference server. In return, the inference server generates the command based on the environmental condition adjustment value ($y_n$) and transmits the command to the environment controller 100 (which forwards the command to a controller equipment 160). Alternatively, the inference server transmits the environmental condition adjustment value ($y_n$) to the environment controller 100; and the environment controller 100 generates and transmits (to a controlled equipment 160) the command based on the environmental condition adjustment value ($y_n$).

Figure 7:
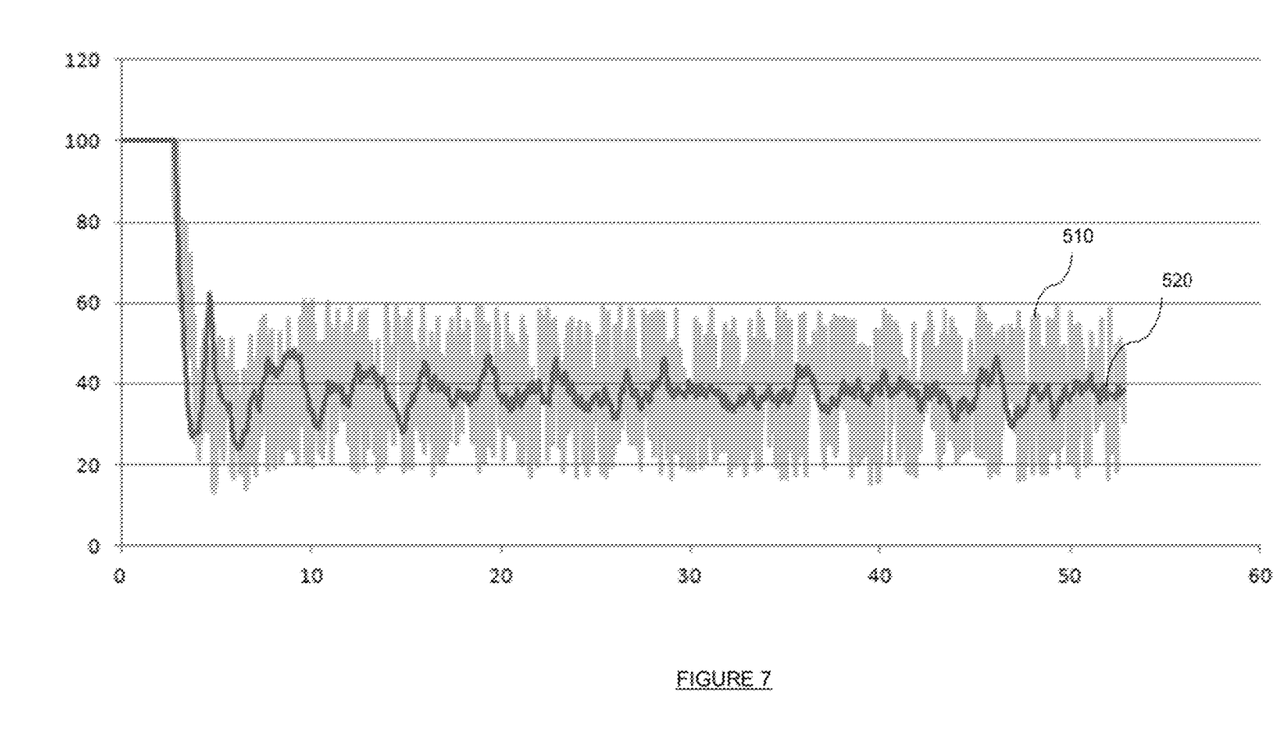
FIG. 7 is an exemplary graph showing the effect of the present adaptive control at reducing stress on controlled equipment.
Figure 8:
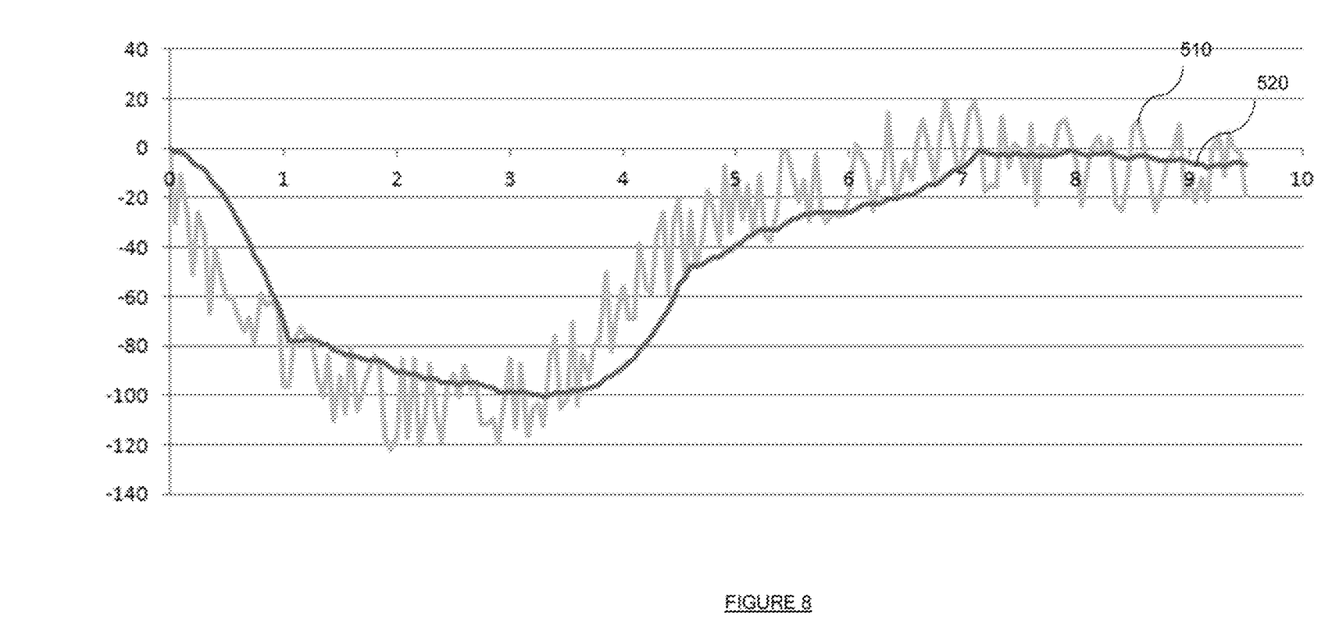
FIG. 8 is another exemplary graph showing the effect of the present adaptive control for reducing stress on controlled equipment.

Reference is now made to FIGS. 7 and 8, which are graphs comparing the effect of the present adaptive control on the command signals generated by the environment controller 100. In the graphs, reference 510 refers to the output signal of the environment controller 100 without the present adaptive control, while reference 520 refers to the output signal of the environment controller 100 with the present adaptive control. As can be appreciated, the present adaptive control reduces the fluctuations in output signal of the environment controller 100, thereby reducing the strain on the controlled equipment, while requiring minimal configuration and/or calibration from the environment controller 100.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environmental condition controller for controlling an environmental condition in an area of a building, the environmental condition controller comprising:
   memory for storing:
     a predictive model generated by a neural network training engine, the predictive model comprising weights of a neural network calculated by the neural network training engine; and
     a previously calculated environmental condition adjustment value ($y_{n-1}$);
   a communication interface for:
     receiving an environmental condition target value ($x_{ref}$); and
     receiving an environmental condition measured value (x);
   a processing unit for:
     calculating an environmental condition adjustment value ($y_n$) by executing a neural network inference engine, the neural network inference engine implementing a neural network using the predictive model for inferring the environmental condition adjustment value ($y_n$) based on inputs, the inputs comprising the previously calculated environmental condition adjustment value ($y_{n-1}$), the environmental condition target value ($x_{ref}$), the environmental condition measured value (x), and an adaptive proportionality value (k);

generating and transmitting a command based on the environmental condition adjustment value ($y_n$); and storing in the memory the calculated environmental condition adjustment value ($y_n$) as a previously calculated environmental condition adjustment value.

2. The environmental condition controller of claim 1, wherein the calculation of the environmental condition adjustment value ($y_n$) is based on more than one previously calculated environmental condition adjustment value used as inputs of the neural network inference engine.

3. The environmental condition controller of claim 1, wherein the environmental condition is one of the following: temperature, pressure, humidity or lighting.

4. The environmental condition controller of claim 1, wherein the command is one of the following: heating, ventilating, cooling, humidifying, dehumidifying or changing lighting.

5. The environmental condition controller of claim 1, wherein the processing unit further iteratively calculates the adaptive proportionality value (k) with the following equation:

$$k = e^{C\Delta t_c} - 1$$

where:
C is calculated using the equation $C = S/(y_{max} - y_{n-1})$;
S is the slope between two previous environmental condition adjustment values over time, and is calculated using the equation $s = dy/dt$;
$y_{max}$ is the environmental condition maximum output; and
$\Delta t_c$ is a time interval between each recursive calculation of the environmental condition adjustment value ($y_n$).

6. The environmental condition controller of claim 5, wherein the processing unit iteratively calculates the adaptive proportionality value (k) when at least one of the following conditions is met:
the environmental condition adjustment value ($y_n$) exceeds the environmental condition value (x); or
when a difference between the environmental condition value (x) and the environmental condition adjustment ($y_n$) is greater than a predefined tolerated variance.

7. A method for controlling an environmental condition in an area of a building, the method comprising:
storing in a memory of an environmental condition controller a predictive model generated by a neural network training engine, the predictive model comprising weights of a neural network calculated by the neural network training engine;
storing in the memory a previously calculated environmental condition adjustment value ($y_{n-1}$);
receiving an environmental condition target value ($x_{ref}$) via a communication interface of the environmental condition controller;
receiving an environmental condition measured value (x) via the communication interface;
calculating by a processing unit of the environmental condition controller an environmental condition adjustment value ($y_n$) by executing a neural network inference engine, the neural network inference engine implementing a neural network using the predictive model for inferring the environmental condition adjustment value ($y_n$) based on inputs, the inputs comprising the previously calculated environmental condition adjustment value ($y_{n-1}$), the environmental condition target value ($x_{ref}$), the environmental condition measured value (x), and an adaptive proportionality value (k);

generating and transmitting by the processing unit a command based on the environmental condition adjustment value ($y_n$); and storing in the memory the calculated environmental condition adjustment value ($y_n$) as a previously calculated environmental condition adjustment value.

8. The method of claim 7, wherein the following steps are performed in a recursive loop:
receiving the environmental condition measured value (x) via the communication interface;
calculating by the processing unit the environmental condition adjustment value ($y_n$) by executing the neural network inference engine;
generating and transmitting by the processing unit the command based on the environmental condition adjustment value ($y_n$), and
storing in the memory the calculated environmental condition adjustment value ($y_n$) as a previously calculated environmental condition adjustment value.

9. The method of claim 8, wherein the recursive calculation of the environmental condition adjustment value ($y_n$) is based on more than one previously calculated environmental condition adjustment value used as inputs of the neural network inference engine.

10. The method of claim 8, wherein the processing unit further iteratively calculates the adaptive proportionality value (k) using the following equation:

$$k = e^{C\Delta t_c} - 1$$

where:
C is calculated using the equation $C = S/(y_{max} - y_{n-1})$;
S is the slope between two previous environmental condition adjustment values over time, and is calculated using the equation $s = dy/dt$;
$y_{max}$ is the environmental condition maximum output; and
$\Delta t_c$ is a time interval between each recursive calculation of the environmental condition adjustment value ($y_n$).

11. The method of claim 10, wherein the adaptive proportionality value (k) is iteratively calculated by the processing unit when at least one of the following conditions is met:
the environmental condition adjustment value ($y_n$) exceeds the environmental condition value (x); or
when a difference between the environmental condition value (x) and the environmental condition adjustment ($y_n$) is greater than a predefined tolerated variance.

12. The method of claim 7, wherein the environmental condition is one of the following: temperature, pressure, humidity and lighting.

13. The method of claim 7, wherein the command is one of the following: heating, ventilating, cooling, humidifying, dehumidifying and changing lighting.

14. A non-transitory computer program product comprising instructions deliverable via an electronically-readable media, such as storage media and communication links, the instructions when executed by a processing unit of an environmental condition controller providing for controlling an environmental condition in an area of a building by:
storing in a memory of the environmental condition controller a predictive model generated by a neural network training engine, the predictive model comprising weights of a neural network calculated by the neural network training engine;

storing in the memory a previously calculated environmental condition adjustment value ($y_{n-1}$);

receiving an environmental condition target value ($x_{ref}$) via a communication interface of the environmental condition controller;

receiving an environmental condition measured value (x) via the communication interface;

calculating by the processing unit an environmental condition adjustment value ($y_n$) by executing a neural network inference engine, the neural network inference engine implementing a neural network using the predictive model for inferring the environmental condition adjustment value ($y_n$) based on inputs, the inputs comprising the previously calculated environmental condition adjustment value ($y_{n-1}$), the environmental condition target value ($x_{ref}$), the environmental condition measured value (x), and an adaptive proportionality value (k);

generating and transmitting by the processing unit a command based on the environmental condition adjustment value ($y_n$); and storing in the memory the calculated environmental condition adjustment value ($y_n$) as a previously calculated environmental condition adjustment value.

15. The computer program product of claim 14, wherein the calculation of the environmental condition adjustment value ($y_n$) is based on more than one previously calculated environmental condition adjustment value used as inputs of the neural network inference engine.

16. The computer program product of claim 14, wherein the environmental condition is one of the following: temperature, pressure, humidity and lighting.

17. The computer program product of claim 14, wherein the command is one of the following: heating, ventilating, cooling, humidifying, dehumidifying and changing lighting.

18. The computer program product of claim 14, wherein the processing unit further iteratively calculates the adaptive proportionality value (k) using the following equation:

$$k = e^{C \Delta t_c} - 1$$

where:

C is calculated using the equation $C = S/(y_{max} - y_{n-1})$;

S is the slope between two previous environmental condition adjustment values over time, and is calculated using the equation $s = dy/dt$;

$y_{max}$ is the environmental condition maximum output; and $\Delta t_c$ is a time interval between each recursive calculation of the environmental condition adjustment value ($y_n$).

19. The computer program product of claim 18, wherein the adaptive proportionality value (k) is iteratively calculated by the processing unit when at least one of the following conditions is met:

the environmental condition adjustment value ($y_n$) exceeds the environmental condition value (x); or when a difference between the environmental condition value (x) and the environmental condition adjustment ($y_n$) is greater than a predefined tolerated variance.

20. The computer program product of claim 14, wherein the following steps are performed in a recursive loop:

receiving the environmental condition measured value (x) via the communication interface;

calculating by the processing unit the environmental condition adjustment value ($y_n$) by executing the neural network inference engine;

generating and transmitting by the processing unit the command based on the environmental condition adjustment value ($y_n$), and storing in the memory the calculated environmental condition adjustment value ($y_n$) as a previously calculated environmental condition adjustment value.

\* \* \* \* \*